(12) United States Patent
Ho et al.

(10) Patent No.: US 7,218,759 B1
(45) Date of Patent: May 15, 2007

(54) FACE DETECTION IN DIGITAL IMAGES

(75) Inventors: Edwin Ho, Glenwood (AU); Alison Joan Lennon, Balmain (AU); Andrew Peter Bradley, Castlecrag (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,003

(22) Filed: Dec. 8, 1999

Related U.S. Application Data (63) Continuation-in-part of application No. 09/326,561, filed on Jun. 7, 1999, now Pat. No. 6,661,907.

(30) Foreign Application Priority Data

Jun. 10, 1998 (AU) .......................................... PP44009

(51) Int. Cl.
 *G06K 9/00* (2006.01)

(52) U.S. Cl. ...................... 382/118; 348/64; 348/135; 348/169; 348/174; 382/103; 382/164; 382/165; 382/199; 382/203; 396/153; 396/165; 396/166

(58) Field of Classification Search ................. 348/64, 348/135, 169–174, 369; 382/103, 118, 164, 382/165, 190, 199, 203; 396/153, 165, 166
See application file for complete search history.

(56) References Cited

U.S. PATENT DOCUMENTS

| | | | | |
|---|---|---|---|---|
| 4,203,671 A | | 5/1980 | Takahashi et al. .......... 356/402 |
| 5,430,809 A | | 7/1995 | Tomitaka ..................... 382/173 |
| 5,488,429 A | | 1/1996 | Kojima et al. ............... 348/653 |
| 5,557,688 A | | 9/1996 | Nakamura ................... 382/164 |
| 5,715,377 A | | 2/1998 | Fukushima et al. ......... 395/109 |
| 5,748,776 A | | 5/1998 | Yoshida ....................... 382/195 |
| 5,781,665 A | * | 7/1998 | Cullen et al. ................ 382/254 |
| 5,802,220 A | * | 9/1998 | Black et al. ................. 382/276 |
| 5,812,193 A | * | 9/1998 | Tomitaka ..................... 348/469 |
| 5,864,630 A | * | 1/1999 | Cosatto et al. .............. 382/103 |
| 5,912,980 A | * | 6/1999 | Hunke ......................... 382/103 |
| 6,028,960 A | | 2/2000 | Graf et al. ................... 382/203 |
| 6,072,496 A | | 6/2000 | Guenter et al. ............. 345/419 |
| 6,148,092 A | | 11/2000 | Qian ........................... 382/118 |
| 6,188,777 B1 | * | 2/2001 | Darrell et al. .............. 382/103 |
| 6,263,113 B1 | | 7/2001 | Abdel-Mottaleb et al. .. 382/237 |
| 6,292,574 B1 | | 9/2001 | Schildkraut et al. ........ 382/117 |
| 6,332,033 B1 | * | 12/2001 | Qian ........................... 382/124 |
| 6,633,655 B1 | * | 10/2003 | Hong et al. ................. 382/118 |
| 6,678,407 B1 | * | 1/2004 | Tajima ........................ 382/167 |

FOREIGN PATENT DOCUMENTS

EP 0 836 326 4/1998

OTHER PUBLICATIONS

"Detecting Human Faces In Color Images", M.H. Yang and N. Ahuja, Proceedings of the 1998 IEEE International Conference on Image Processing (ICIP 98), pp. 127–139 Chicago, Oct. 1998.

"Automatic Facial Feature Detection And Location", R. Pinto–Elias and J.H. Sossa–Azuela, IEEE International Conference on Computer and Pattern Recognition 1998, pp. 1360–1364.

* cited by examiner

*Primary Examiner*—Gregory Desire
(74) *Attorney, Agent, or Firm*—Fitzpatrick, Cella, Harper & Scinto (57) ABSTRACT

A method and apparatus for the detection of faces in a digital image captured under a variety of lighting conditions are provided. Rather than subjecting an entire image to computationally intensive face detection analysis, the image is subjected to computationally simply analysis to identify candidate pixels likely to be of skin colour. Only those pixels having such color are subject to computationally intensive face detection analysis. The pixels are selected by first selecting a color distribution model based on an image capture condition provided with the color digial image. Then, the color of the pixels is tested using the distribution model to determine those pixels having predominantly skin color. Preferably, the distribution model is selected from among a number of different distribution models with each of the distribution models associated with a different set of lighting conditions. In this way, a face detection process may accommodate a variety of lighting conditions associated with the capture of an image using a computationally simple analysis.

41 Claims, 6 Drawing Sheets

FACE DETECTION IN DIGITAL IMAGES

CROSS REFERENCE TO RELATED APPLICATION

This application is a continuation-in-part of application Ser. No. 09/326,561 filed Jun. 7, 1999 now U.S. Pat. No. 6,661,907.

BACKGROUND ART

Colour digital images are increasingly being stored in multi-media databases, and utilised in various computer applications. En many such applications it is desirable to be able to detect the location of a face in a visual image as one step in a multi-step process. The multi-step process can include content-based image retrieval, personal identification or verification for use with automatic teller machines or security cameras, or automated interaction between humans and computational devices.

Various prior art face detection methods are known including eigenfaces, neural networks, clustering, feature identification and skin colour techniques. Each of these techniques has its strengths and weaknesses, however, one feature which they have in common is that they are computationally intensive and therefore very slow, or they are fast but not sufficiently robust to detect faces.

The eigenface or eigenvector method is particularly suitable for face recognition and there is some tolerance for lighting variation, however it does not cope with different viewpoints of faces and does not handle occlusion of various facial features (such as occurs if a person is wearing sunglasses). Also it is not scale invariant The neural network approach utilises training based on a large number of face images and non-face images and has the advantages of being relatively simple to implement, providing some tolerance to the occlusion of facial features and some tolerance to lighting variation. It is also relatively easy to improve the detection rate by re-training the neural network using false detections. However, it is not scale invariant, does not cope with different viewpoints or orientation, and leads to an exhaustive process to locate faces on an image.

The clustering technique is somewhat similar to the eigenface approach. A pixel window (eg 20×20) is typically moved over the image and the distance between the resulting test pattern and a prototype face image and a prototype non-face image is represented by a vector. The vector captures the similarity and differences between the test pattern and the face model. A neural network can then be trained to classify as to whether the vector represents a face or a non-face. While this method is robust it does not cope with different scales, different viewpoints or orientations. It leads to an exhaustive approach to locate faces and relies upon assumed parameters.

The feature identification method is based upon searching for potential facial features or groups of facial features such as eyebrows, eyes, nose and mouth. The detection process involves identifying facial features and grouping these features into feature pairs, partial face groups, or face candidates. This process is advantageous in that it is relatively scale invariant, there is no exhaustive searching, it is able to handle the occlusion of some facial features and it is also able to handle different viewpoints and orientations. Its main disadvantages are that there are potentially many false detections and that its performance is very dependent upon the facial feature detection algorithms used.

The use of skin colour to detect human facts is described in a paper by Yang J and Waibel A (1995) "Tracking Human Faces in Real-Time" CMU-CS-95-210, School of Computer Science, Carnegie Mellon University. This proposal was based on the concept that the human visual system adapts to different levels of brightness and to different illumination sources which implies that the human perception of colour is consistent within a wide range of environmental lighting conditions. It was therefore thought possible to remove brightness from the skin colour representation while preserving accurate, but low dimensional, colour information. As a consequence, in this prior art technique, the chromatic colour space was used. Chromatic colours (eg. r and g) can be derived from the RGB values as:

$$r=R/(R+G+B) \text{ and } g=G/(R+G+B)$$

These chromatic colours are known as "pure" colours in the absence of brightness.

Utilising this colour space, Yang and Waibel found the distribution of skin colour of different people, including both different persons and different races, was clustered together. This means that the skin colours of different people are very close and that the main differences are in differences of intensity.

This prior art method first of all generated a skin colour distribution model using a set of example face images from which skin colour regions were manually selected. Then the test image was converted to the chromatic colour space. Next each image in the test image (as converted) was then compared to the distribution of the skin colour model. Finally, all skin colour pixels so detected were identified, and regions of adjacent skin colour pixels could then be considered potential face candidates.

This prior art method has the advantage that processing colour is much faster than processing individual facial features, that colour is substantially orientation invariant and that it is insensitive to the occlusions of some facial features. The system is also substantially viewpoint invariant and scale invariant. However, the method suffers from a number of disadvantages including that the colour representation of the face can be influenced by different lighting conditions, and that different cameras (eg. digital or film) can produce different colour values even for the same person in the same environment.

However a significant disadvantage of the prior art methods is that the ski colour model is not very discriminating (ie. selecting pixels on a basis of whether they are included in the skin color distribution results in a lot of non-skin colour pixels being included erroneously). It is also difficult to locate clusters or regions of skin colour pixels that can be considered as candidate faces.

SUMMARY OF THE INVENTION

An object of the present invention is to provide an improved method of detecting one or more faces in digital colour images.

In accordance with an aspect of the present invention, a method of detecting a face in a color digital image formed of a plurality of pixels includes selecting a color distribtion model from a plurality of color distribution models, the selection being dependent on at least one image capture condition provided with the color digital image. Once the color distribution model has been selected, the plurality of pixels are tested using the color distribution model to determine those pixels having predominantly skin color. Thereafter, only those pixels determined as having predominantly skin color are subjected to further facial feature analysis while those pixels not being predominantly of skin color are not subjected to the further facial feature analysis.

In another aspect of the invention, the image capture condition is acquired at a time the color digital image is captured.

In another aspect of the invention, the color digital image is encoded according to a predetermined format and the image capture condition is represented as meta-data associated with the predetermined format.

In another aspect of the invention, the image capture condition includes lighting conditions at a time the color digital image was captured.

In another aspect of the invention, the testing step includes a sub-step, preceding the testing, of dividing the color digital image into a plurality of regions, each region including a plurality of pixels. The testing is performed on pixels within each region to dermine those regions that are predominantly of skin color. The subjecting step further includes performing the facial feature analysis on only those regions determined to be predominantly of skin color.

In another aspect of the invention, a region is determined to be predominantly of skin color if more than a predetermined percentage of the total number of pixels in the region are classified as being of skin color.

In another aspect of the invention, the plurality of regions are geometrically divided from the color digital image.

In another aspect of the invention, the plurality of regions are formed of pixels having substantially homogenous color.

In another aspect of the invention, the plurality of regions are formed using a region growing method based upon color differences.

In another aspect of the invention, distribution models are generated using previously sampled facial image data. In this way, color distribution models can be generated for a particular image capture device and separate color distribution models can be generated for different image capture conditions.

In another aspect of the invention, the image capture condition includes lighting conditions at a time the color digital image was captured and separate color models are generated for different lighting conditions at a time the previously sampled facial image data was captured. Examples of different color distribution models generated for different lighting conditions include: color distribution models for images taken with a flash; for images taken without a flash; for images taken indoors; and for images taken outdoors.

In various aspects of the invention, the color distribution models are represented in a variety of ways. As examples, color distribution models may be represented as frequency histograms of color representation vectors, as probability distributions of color representation vectors, and as binary maps of color representation vectors. The color representation vectors may also take on different forms. For example, the color representation vectors may be derived from perceptual color space values of predetermined skin-color pixels in perviously sampled facial image data, or the color representation vectors may contain chromatic color values derived from those RGB values of predetermined skin-color pixels in the previously sampled facial image data.

In another aspect of the invention, a binary map of color representation vectors includes a percentage of the skin color pixels that were identified in the previously sampled facial image data. Using such a binary map, a pixel is classified as being of skin color if the color representation vector corresponding thereto occurs within the binary map.

In another aspect of the invention, a pixel is classified as being of skin color if the frequency of the color representation vector corresponding thereto exceeds a predetermined threshold frequency.

In another aspect of the invention, a pixel is classified as being of skin color if the probability of the color representation vector corresponding thereto exceeds a predetermined probability threshold.

BRIEF DESCRIPTION OF THE DRAWINGS

A number of embodiments of the present invention will now be described with reference to the drawings in which.

DETAILED DESCRIPTION INCLUDING BEST MODE

Figure 1:
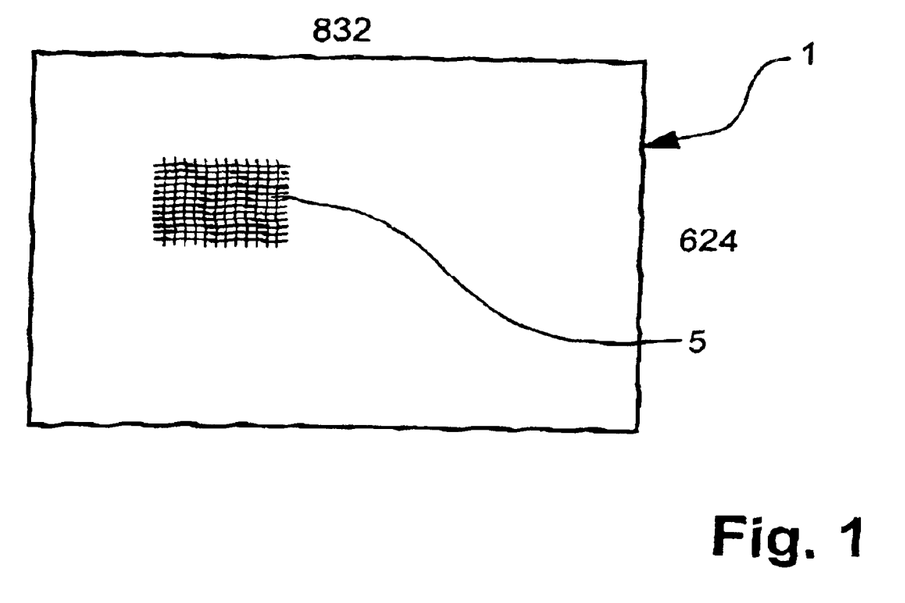
FIG. 1 is a schematic representation of the pixels of a colour digital image.

FIG. 1 illustrates a typical colour digital image 1 having a size of 832×624 pixels 5, each of which has an RGB value.

Figure 2:
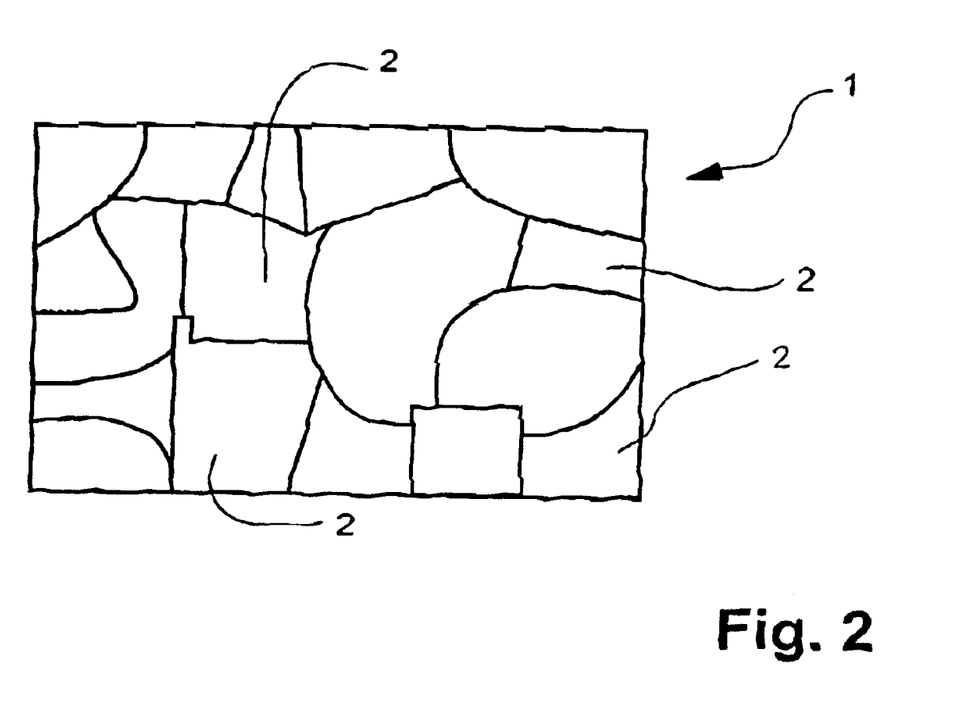
FIG. 2 shows the segmenting of the image of FIG. 1 into a plurality of regions each having a substantially homogenous colour according to a first embodiment.

According to a first embodiment of the present invention, rather than consider the skin colour of the image on a pixel by pixel basis as described above in relation to the prior art of Yang and Waibel, the image 1 is segmented into a number of regions. An example of such segmentation is schematically illustrated in FIG. 2 on the segmentation basis that all the pixels in each region 2 have substantially the same colour. Alternatively the image may be segmented into arbitrary regions for processing.

Figure 3:
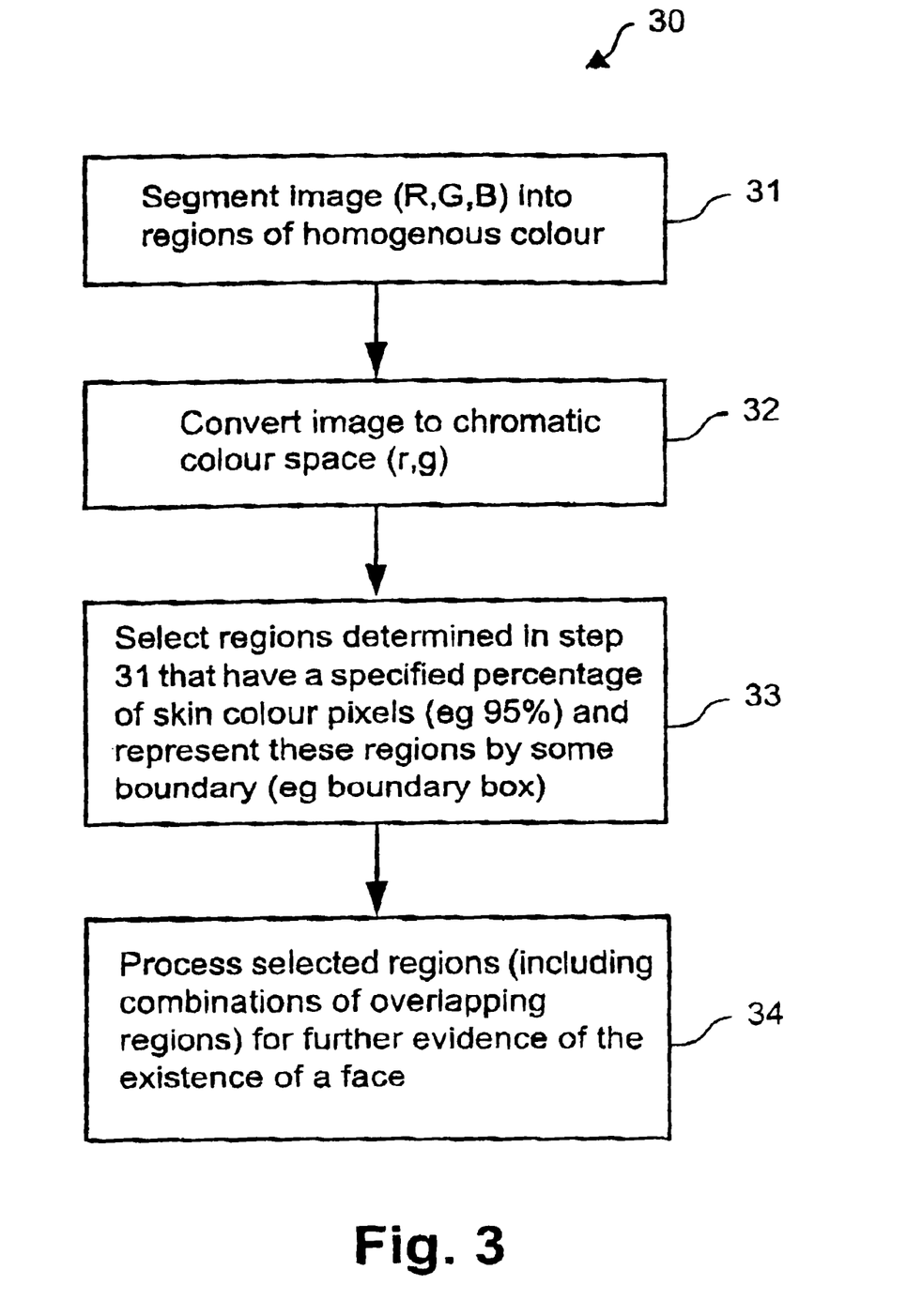
FIG. 3 is a flow chart of a face detection process according to the first embodiment.

The first embodiment implements a process 30 illustrated in the flow chart of FIG. 3, in which the regional segmentation of the image is carried out at step 31. Next, the regions of the image are converted in step 32 into the chromatic colour space (as descried above). The next step 33 is to select those of the regions determined in step 31 which have a specified percentage (typically in the range 90–95%) of pixels having a skin colour. These selected regions are then conveniently represented by a boundary box or other boundary indication. Finally, at step 34 the selected regions, including any combinations of overlapping regions, are subjected to a further analysis (preferably not based on skin colour) to determine if the selected region(s) represent a face or faces.

This initial colour grouping can use any region based colour image segmentation technique. Preferably the image is partitioned into colour regions by seeking connected groups of pixels which have similar colours over a local region. Very small isolated initial spatial groupings can be ignored in order to find major colour regions and reduce a noise effect. A representative colour of each initial spatial region is determined by an average colour value of the region.

A colour region starts from an arbitrarily chosen pixel, which is compared with its neighbouring pixels. The region size is increased by adding neighbouring pixels, which are similar in colour, using a colour similarity threshold T A neighbouring pixel is added to the region if |Rp−Rm|<T and |Gp−GM|<T and |Bp−Bm|<T, where Rp, Gp, Bp are R, G, B values of the neighbouring pixel and Rm, Gm, Bm represented average R, G, B values of the region.

When a region has no more neighbouring pixels of similar colour, the region stops growing and represents one of the initial spatial groupings. If the region size is below a predetermined threshold value, it is ignored. A region having a pixel number equal or greater than the predetermined threshold is represented by its average colour.

A new pixel which does not yet belong to any region is chosen to start a new colour region. The process continues until each pixel in the image either belongs to an initial spatial grouping or has been ignored as being part of a small region.

The initial spatial groupings provide a colour region segmentation of the image with each region being represented by its average colour.

In this way, for most images where the bulk of the image is not a face, or part of a face, the majority of pixels will be grouped into regions or objects (be they foreground or background, etc) which are clearly not faces. Therefore these non-facial objects can be quickly eliminated on the basis of their colour.

Once the regions have been deter they arm then converted into the "pure" chromatic colour space utilising the equations given above so as to provide r and g values. A generous rule such as a rule Mat at least 85% of the pixels within a given region be of face colour can be used to select those regions worthy of further examination. Preferably, the test for face colour takes into account the nature of the original image, for example whether the image was taken with or without a flash. This information can be determined from the image source, eg. a camera.

Thereafter, only those selected regions are subjected to a further test to determine the presence of facial features. This flier test provides a conclusive determination as to whether or not a region constitutes a face. In this connection, the further test is likely to be computationally slower and therefore the above described elimination of regions ensures that the computationally slow method is only applied to relatively small portions of the overall image. Thus the total processing time is reduced. Accordingly, the above method performs a computationally simple process on most, if not all pixels, and then only performs complex examination on skin colour regions.

The preferred method of verifying if a region represents a face relies upon edge detection techniques as a means of detecting facial features. In particular facial features such as eyes, eyebrows and mouths often appear as dark bars on a face and thus provide dark edges.

The preferred form of edge detection is use of an edge detection filter, This utilises two functions operating in orthogonal directions. To detect a horizontal bar a second derivative Gaussian function is used in the vertical direction and a Gaussian function is used in the horizontal direction.

Once an edge has been determined in this way each detected edge is examined. Any pair of detected edges can be found to be derived from, and thus be indicative of, a pair of eyes, a pair of eyebrows, or an eye and associated eyebrow, depending upon the relative position and ie of the detected edges. Similarly, an individual edge can be derived from, and thus be indicative of, a mouth if it is located at an appropriate position relative to the eyes and/or eyebrows already detected.

By proceeding in this fashion, a given region begins to accumulate facial features building from skin tone through eyebrows/eyes and then to a mouth. The more facial features found for a given region which is a face candidate, the grease the possibility that the candidate actually is a face.

Furthermore, the above described method has the advantage that it is able to cater for the circumstance where a face is backgrounded against a background region of substantially the same colour. Under these circumstances, in Yang and Waibel's method, no boundary between the face and the background would be likely to be detected Therefore the region as a whole would be selected for further testing. However, the above method utilises the full colour space to segment the image, before making decisions about which pixels are skin colour. Consequently the face is more likely to be separated from the background. In addition, the method is naturally independent of orientation or partial occlusion of the face.

Furthermore, the above method also permits false positives to be examined at the further stage and therefore does not exclude from subsequent testing regions which are likely to be ultimately determined as a facial region.

The first embodiment described above notes that the nature of the original image may be taken into account when performing an initial face detection process. Further embodiments to be now described build upon this feature.

When an image is captured using a camera it is necessary either for the person taking the picture to manually establish the camera settings (such as shutter speed, aperture, focal length, etc), or for the camera to perform this operation automatically. Whichever is the case, the settings of the camera directly effect the appearance and quality of the image taken. In particular, the perceived brightness, colour, and sharpness of the objects within an image all depend on how the settings of the camera are configured For example, it is possible to take two pictures of the same scene with different camera settings and to obtain two images in which the same objects appear with different colours and brightness. Therefore, the ability to calibrate (in particular) colour information contained in (digital) images enables a broad variety of object detection and classification tasks in which colour is a strong discriminating feature.

Face detection is one such example application, and the present inventors have determined that the creation of face colour distribution models (CDM's), each adapted to specific lighting conditions, that can improve both the accuracy and reliability of fare detection. Variations in lighting conditions can result from the use of a flash, such being a feature recognised as contributing in the face detection method of the first embodiment. Since lightness is representative of colour features such as luminance and chrominance, such features may be used to quantify face detection.

Before an image wan be processed using a face colour distribution model the face colour distribution model must be constructed. This is performed according to a method 50 shown in FIG. 5. The method 50 firstly gathers image samples at step 52 that are representative images th contain faces, the images being acquired under a variety of lighting conditions and thus indicative of changes in luminance and chrominance. These images are then manually examined in step 54 to extract regions of skin colour for further processing in model formation. Step 54 may be performed by manually drawing a bounding box around a sample of face coloured pixels. Step 56, which follows, derives colour representation values for the extracted pixels. This may be performed by transforming the extracted pixels into a Ritual colour space such as CIE L*u*v or CIE L*a*b, so that each pixel is represented by at least a 2-dimensional vector. Alternatively other colour spaces such as HLS and RSV may be used. Preferably each pixel is represented as a length-3 vector incorporating both the luminance and chrominance values.

Figure 5:
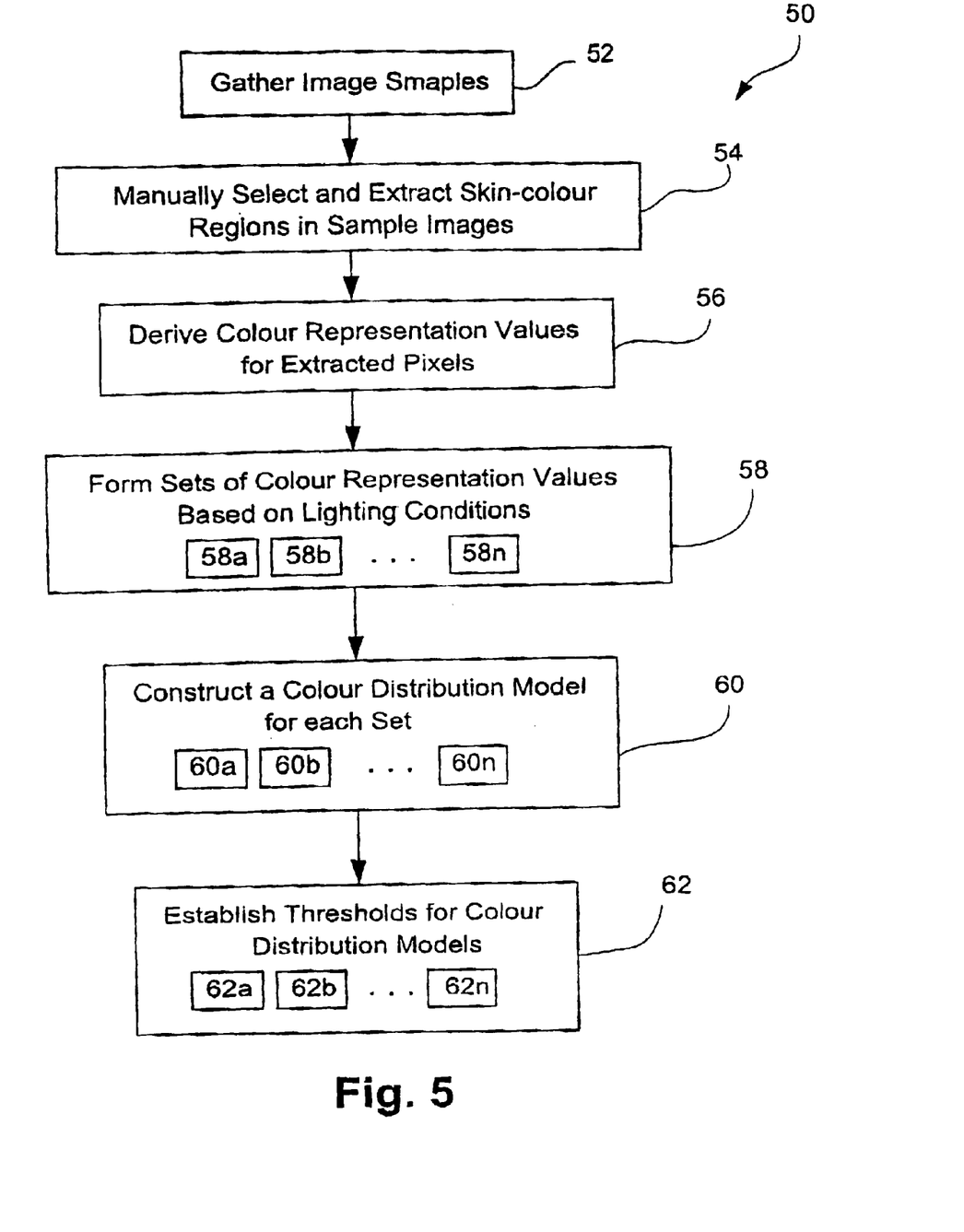
FIG. 5 is a flow chart depicting the generation of a face colour distribution model.

The colour representation values of pixels are then divided at step 58 into a number of sets (58a, 58b . . . 58n) according to the lighting conditions present when each of the images were captured Example sets are flash, non-flash, indoor, outdoor, and combinations of these. Alternatively, lighting parameters obtained directly from the camera such as the operation of a flash, may be used to identify and distinguish the sets. Other lighting conditions such as bright or cloudy, dusk or dawn, or a type of artificial light such as fluorescent, incandescent or halogen, may be used or detected for these purposes. These details may be provided by means of human input at the time of image capture.

For each of the sets (58a . . . 58n) of face samples, stop 60 then constructs a corresponding colour distribution model (CDM) (60a . . . 60n) that best fits the samples of face colour pixels. The CDM can be a histogram, a probability density function, or a binary map. In one embodiment, a mixture of Gaussian PDF's are fit to the sample data using techniques known in the art such as the expectation maximisation (EM) algorithm, with either cross-validation, jackknife, and bootstrap techniques being used to estimate the goodness of fit of the model.

When each CDM (60a . . . 60n) has been constructed, it is then desirable as shown in step 62 to establish a corresponding probability threshold (62a . . . 62n) below which a colour vector is to be classified as relating to a non-face pixel, and above which the colour vector is to be classified as a potential face pixel. Additionally, the face colour probability can be used directly in further facial image analysis steps detailed below. In the preferred embodiment, the CDM is constructed from colour representation values derived using a perceptual colour space (such as CIE L*u*v or CIE L*a*b) and then transformed back into the colour format of the input image, ie., either RGB or YUV. This removes the necessity for transforming the input image into the perceptual colour space.

Since different image capture devices have differing performance, often determined by the quality and size of optical components (eg. lens, mirrors, aperture etc.), typically a CDM or a set of CDM's are generated for a particular capture device, In one implementation, where the image capture device (eg. camera) includes a light meter, a reading from the light meter at the moment the image was captured can be used to determine the required CDM. In this fashion, a greater range of colour models may be devised and can be selected without possible human interference. Such interference may occur where the human user manually selects the operation of the flash where otherwise automatic operation of the flash would not be required. Further, the flash/outdoors example sets above give rise to four (4) sets of CDM's. Using a light meter with, say, 4-bit encoding, can provide sixteen (16) models. Also, use of a light meter provides for enhanced reproducability of results and enables the face samples used to generate the models to be taken under laboratory conditions and installation at the time of camera manufacture.

Figure 6:
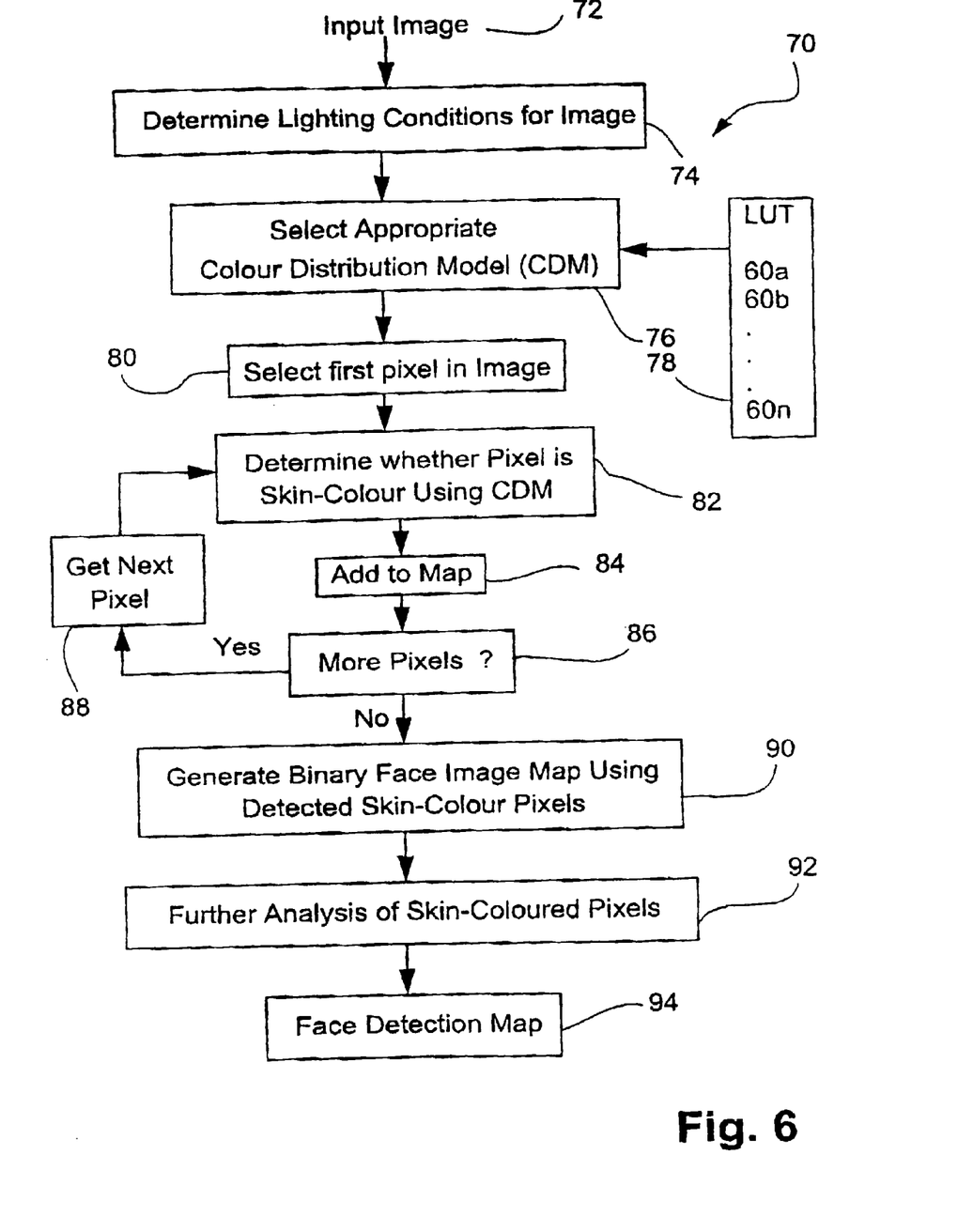
FIG. 6 is a flow chart of a face detection process according to a second embodiment.

The processing 70 of an image according to a second embodiment is shown in FIG. 6. An input image is provided at step 72 and at step 74 the lighting conditions under which the image was captured are determined. Such a determination may be based on binary data obtained directly from the camera (eg. flash+indoors, no$_{13}$flash+outdoors, no$_{13}$flash+indoors, flash+outdoors) or corresponding meta-data provided with, or accompanying, the image, which may be encoded or otherwise communicated according to a predetermined format. Once the lighting conditions are determined, a corresponding or closest CDM is selected from a bank of look-up tables 78 retaining the CDM's (60a . . . 60n) previously determined. At step 80, a fire pixel of the input image 72 is selected and at step 82 is tested to see if th (GB or YUV) colour of the pixel is contained in the selected CDM (60a . . . 60n).

The steps shown in FIG. 6 following the comparison of step 82 depend upon the manner in which the CDM's are stored. In a preferred implementation, the selected thresholds of step 62 (FIG. 5) are used to construct a binary map or look-up table, where a representative colour vector is represented by a 1 if it is a colour vector that is contained within the thresholded face colour distribution, and by a 0 if the colour vector does not occur in the thresholded colour distribution. Alternatively, the CDM may represent the frequencies of the representative colour vectors of the thresholded colour distribution (ie. the CDM is effectively a histogram of representative colour vectors). A further variation is the case where a sampled distribution is approximated by a parametric model such as a Gaussian or a mixture of Gaussians. In the latter case, the CDM comprises the parameters of the model (eg. mean, co-variance)

As seen in FIG. 6, and according to the preferred implementation, a 1 or 0 value arising from step 82 is added to a map in step 84. Step 86 determines if there arc more pixels in the image to be processed and step 88 obtains and passes the next pixel to step 82 for appropriate testing. When all pixels have been tested against the selected CDM, step 90 indicates the result of the preceding steps as being a binary face image map formed using detected skin-coloured pixels The map is then subjected at step 92 to further analysis of the skin-coloured pixels to provide at step 94 a face detection map for the image. The further analysis of step 92 is, like the first embodiment, preferably independent of considerations of facial colour.

In practice, binary face map formed at step 90 may contain areas where either there are small non-face pixels (0's) surrounded by face pixels (1's), or vice versa. One approach for further analysis according to step 92 is processing the binary face image map so as to set to 0 any pixel locations which are contained in areas that arm smaller than the smallest size of a potential face and to set any 0 pixel locations to 1 if they are surrounded by likely face colour pixels. This may be performed using a pair of morphological opening and closing operations with suitably shaped structuring elements. A first structuring element such as:

$$\begin{bmatrix} 0 & 1 & 1 & 0 \\ 1 & 1 & 1 & 1 \\ 1 & 1 & 1 & 1 \\ 0 & 1 & 1 & 0 \end{bmatrix},$$

is used in the opening operation to remove potential face candidate pixel locations below this size. A second structuring element such as:

$$\begin{bmatrix} 1 & 1 \\ 1 & 1 \end{bmatrix},$$

is used in the closing operation to fill any holes in potential face candidate pixel locations.

Alternative approaches to the use of the structuring elements include using a Hough transform, or to count the number of pixels in the region having skin colour and to threshold that count against a predetermined percentage value, Other methods may be used to perform these tasks.

The result of the process 70 of FIG. 6 is a face detection map of pixel locations in the input image at which a face has bean detected, and in all likelihood, a face is present The aforementioned edge detection method of r processing the likely face pixels to determine if a face exits may then be performed on the face detection map 94 resulting from file method 70.

In the preferred embodiment, the face colour distribution models are built for a number of separate lighting conditions, such as flash, non-flash, indoor, outdoor, and the like. However, this technique may be extended to the more general case of arbitrary lighting conditions based directly on parameters obtained from the camera. A list of camera parameters that may be of use in this situation is as follows:

(i) white balance;
(ii) white balance mode
(iii) aperture (iris);
(iv) shutter speed;
(v) auto gain control (AGC);
(vi) auto exposure (AE) mode;
(vii) gamma;
(viii) pedestal level; and
(ix) flare compensation.

The parameters obtained from the camera are preferably obtained from a meta-data stream associated with the capture of each image (or video sequence). Examples, of such transmission protocols include IEEE 1394 ("firewire"). Also the ISO standards have defied methods for attaching meta-data to images and video in MPEG-7, MPEG4, and JPEG.

Whilst the first embodiment described with reference to FIGS. 1 to 3 divides the image according to regions of substantially homogeneous colour, the second embodiment, and a third embodiment, are not so constrained.

Figure 7:
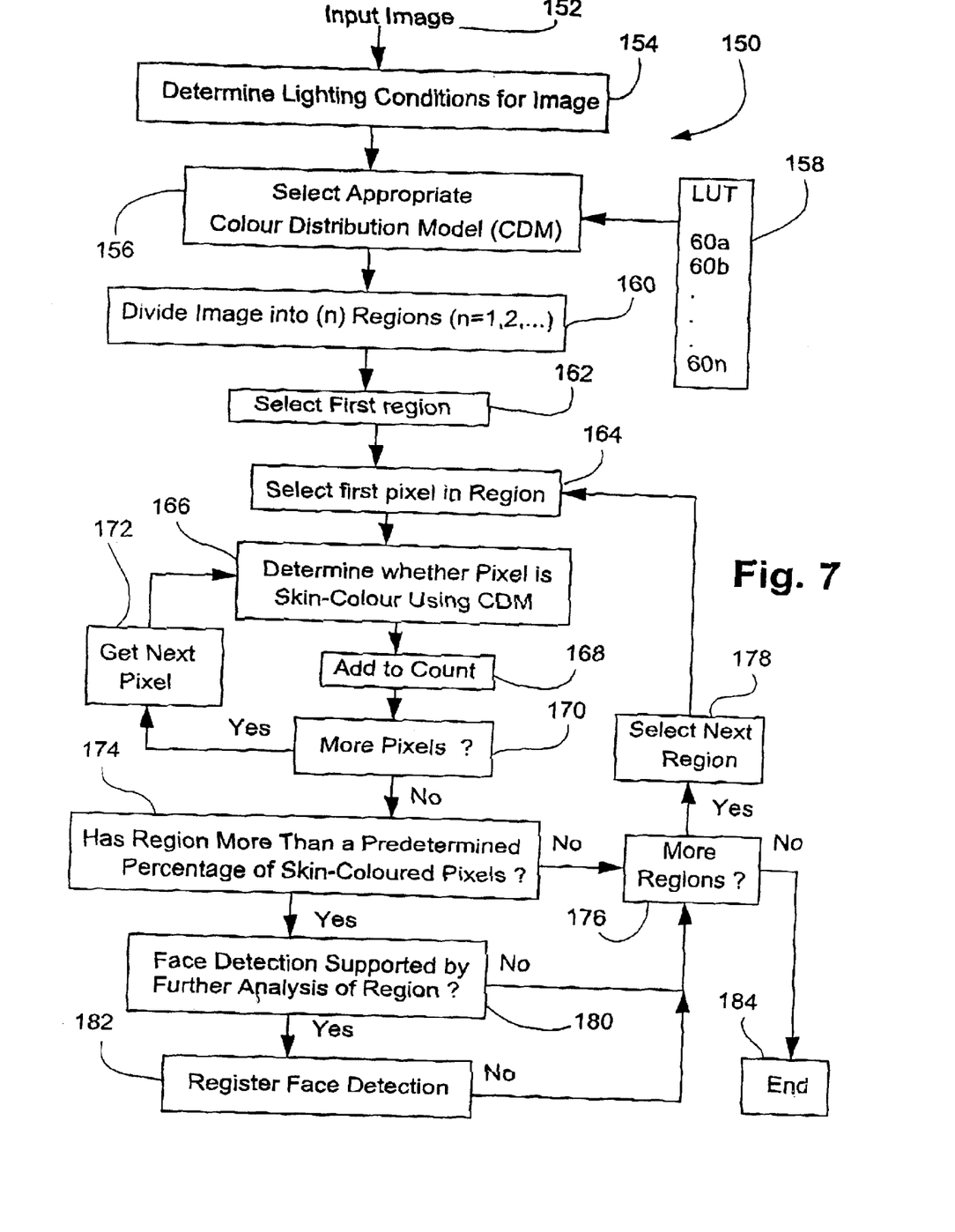
FIG. 7 is a flow chart of a face detection process according to a third embodiment.

The embodiment is depicted in FIG. 7 by a method 150 where an input image 152 is provided and processed according to steps 154, 156 and 158 corresponding to steps 74, 76 and 78, respectively, of the second embodiment. Once the appropriate CDM has been selected in step 156, step 160 follows to process the input image as one or more regions. As a single region, the entirety of the image is processed on a pixel-by-pixel basis. Alternatively, the input image may be geometrically divided into simple pixel blocks (eg. 25×25 pixels, 10×20 pixels) which can be formed and processed in raster order. A further alternative, is where the regions, like the first embodiment, are divided on the basis of substantially homogeneous colour.

Step 162 selects a first region to be processed and step 164 a first pixel of that region. Step 166 compares the selected pixel with the CDM in a manner corresponding to step 82 of the second embodiment. Where the pixel matches the model, step 168 increments a count of pixels in the region meeting that criteria. Step 170 determines whether there are any other pixels is the region to be processed and, if so, step 172 obtains the next pixel and returns to step 166 for appropriate testing. When all pixels in the region have been processed, step 174 follows to compare the percentage of pixels classified for the region as skin colour against a predetermined percentage threshold value. Where the percentage is less than the predetermined number, the region is considered a non-face region and step 176 follows to test if there are any more regions to be processed. If so, step 178 selects the next region and returns processing to step 164. The count is then re-set If not, the method 150 ends at stop 184.

Where the percentage exceeds the predetermined percentage, the region is considered a possible face region and step 180 follows to assess the region according to further facial detection analysis Where such analysis does not detect a face, the method 150 proceeds to step 176 to process any further regions. Where the further analysis of step 180 detects a face, step 182 registers that region as a face region and returns to step 176.

An example of the further analysis able to be performed as a consequence of appropriate marking at step 180 is the edge detection method described above in relation to the first embodiment.

The above described embodiments each indicate that face detection in images may be performed as a two stage process, a first representing something akin to a first filtering of the image to obtain likely candidate pixels or regions, and the second representing more thorough analysis to provide an actual determination on those pixels or regions passed by the fist stage. In each case, lighting conditions associated with the capture of the image contribute to the determination performed by the first stage.

Figure 4:
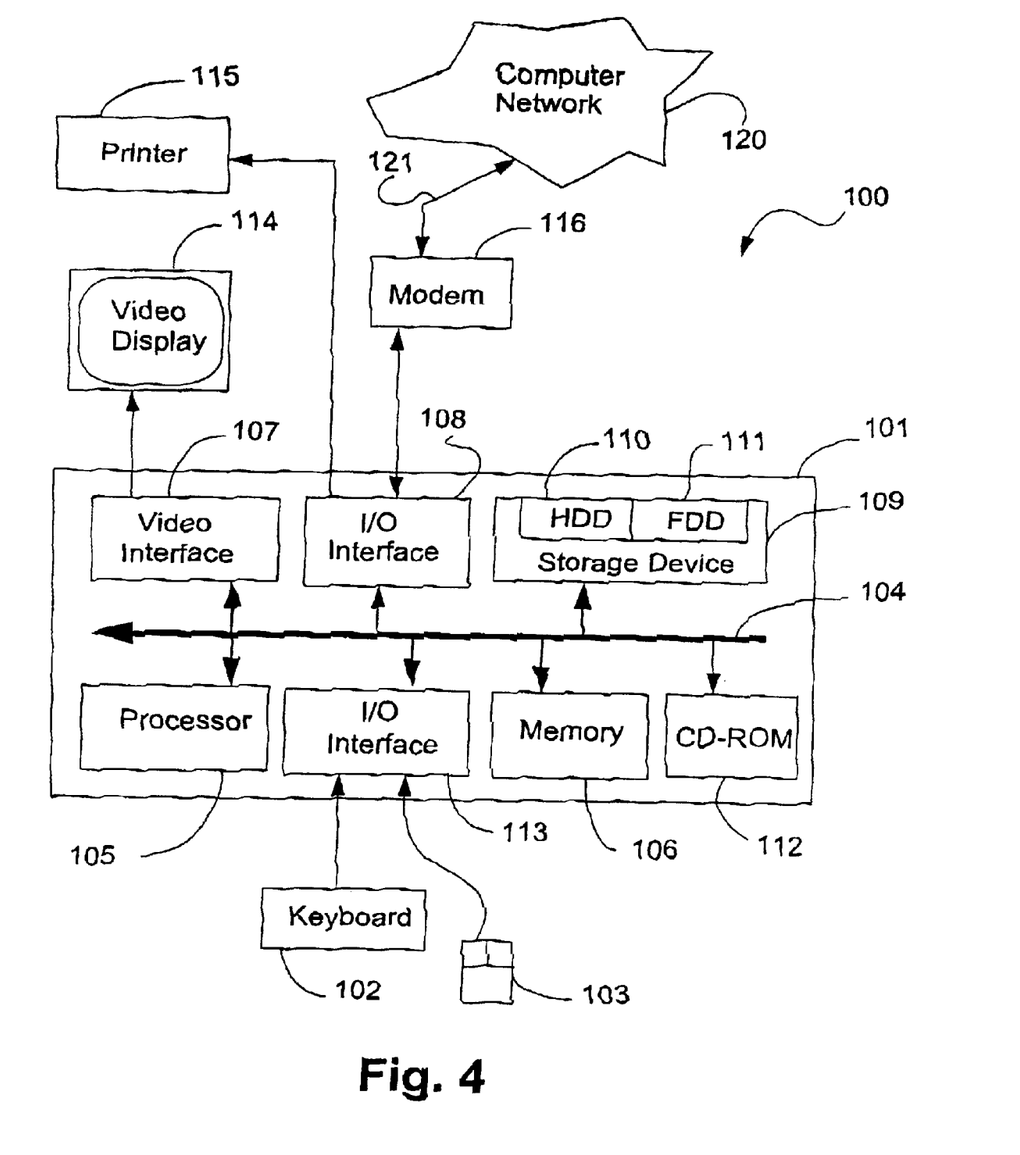
FIG. 4 is a schematic block diagram of a general purpose computer upon which embodiments of the present invention can be practised.

The above described methods are preferably practiced using a conventional general-purpose computer system 100, such as that shown in FIG. 4 where the processes of FIG. 3 and/or FIGS. 5 and 6 are implemented as software, such as an application program executing within the computer system 100. In particular, the steps of the methods are effected by instructions in the software that are carried out by the computer. The software may be divided into two separate parts; one part for carrying out the above method steps; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for detecting face candidate regions in accordance with the embodiments of the invention.

The computer system 100 comprises a computer module 191, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium, The modem 116 can be used to obtain access to the Internet, and other network systems, such as a Local Area Network (LAN) or a Wide Area Network (WAN), these being possible sources of input images and destinations for detected faces.

The computer module 101 typically includes at least one processor unit 105, a memory unit 106, for example formed from semiconductor random access memory (RAM) and rad only memory (ROM), input/output (VO) interfaces including a video interface 107, and an VO interface 113 for the keyboard 102 and mouse 103 and optionally a joystick (not illustrated), and an interface 108 for the modern 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparc-stations or alike computer systems evolved therefrom.

Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In same instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable medium including magnetic tape, a ROM or integrated circuit, a magneto-optical disk, a radio or infrared transmission channel between the computer module 101 and another device, a computer readable card such as a PCMCIA card, and the Internet and Intranets including e-mail transmission and information recorded on Websites and the like. The foregoing is merely exemplary of relevant computer readable mediums. Other computer readable mediums may be practiced without departing from the scope and spirit of the invention.

The further processing to candidate face images and regions may also be performed by or Hug the computer system 100 and known arrangements for such processing.

The method of detecting face candidate regions may alternatively be implemented in dedicated hardware such as one or more integrated circuits performing the functions or sub functions of FIG. 3 and/or FIGS. 5 and 6. Such dedicated hardware may include graphic processors, digital signal processors, or one or more microprocessors and associated memories.

INDUSTRIAL APPLICABILITY

It is apparent from the above that the embodiments of the invention are applicable in fields such as content-based image retrieval, personal identification or verification for use with automatic teller machines or security cameras, or automated interaction between humans and computational devices.

The foregoing describes only some embodiments of the present invention, and modifications and/or change can be made thereto without departing from the scope and spirit of the invention as defined in the claims.

We claim:
1. A method of detecting a face in a color digital image formed of a plurality of pixels, said method comprising the steps of:
   selecting a color distribution model from a plurality of color distribution models, the selection being dependent on at least one image capture condition provided with the color digital image;
   testing the color of the plurality of pixels to determine those pixels having predominantly skin color, the testing utilizing the selected color distribution model; and
   executing a facial feature analysis based on the pixels determined as having predominantly skin color in the testing step.
2. A method according to claim 1, wherein the at least one image capture condition is acquired at a time the color digital image is captured.
3. A method according to claim 2, wherein the color digital image is encoded according to a predetermined format and the at least one image capture condition is represented as meta-data associated with the predetermined format.
4. A method according to claim 1 wherein the at least one image capture condition comprises lighting conditions at a time the color digital image was captured.
5. A method according to claim 1, wherein said testing step comprises the sub-step, preceding the testing, of dividing the color digital image into a plurality of regions, each region comprising a plurality of pixels,
   wherein the testing is performed on pixels within each region to determine those ones of the plurality of regions that are predominantly skin color, and said executing step comprises performing the facial feature analysis on only those regions determined to be predominantly of skin color.
6. A method according to claim 5, wherein one of the plurality of regions is determined to be predominantly skin color if more than a predetermined percentage of the total number of pixels in the one region are classified as being skin color.
7. A method according to claim 5, wherein the plurality of regions are geometrically divided from the color digital image.
8. A method according to claim 5, wherein the plurality of regions are formed of pixels having substantially homogenous color.
9. A method according to claim 8, wherein the plurality of regions are formed using a region growing method based upon color differences.
10. A method according to claim 5, wherein said executing step is independent of face color.
11. A method according to claim 1, wherein the selected color distribution model has been generated using previously sampled facial image data.
12. A method according to claim 11, wherein the color distribution model is generated for a particular image capture device.
13. A method according to claim 11, wherein separate color distribution models are generated for different image capture conditions.
14. A method according to claim 13, wherein the at least one image capture condition comprises lighting conditions at a time the color digital image was captured and separate color models are generated for different lighting conditions at a time the previously sampled facial image data was captured.
15. A method according to claim 14, wherein separate color distribution models are generated for groups of images taken with a flash and images taken without a flash.

16. A method according to claim 14, wherein separate color distribution models are generated for groups of images taken indoors and images taken outdoors.

17. A method according to claim 11, wherein each color distribution model is represented as a frequency histogram of color representation vectors.

18. A method according to claim 17, wherein each of the plurality of pixels is classified as being skin color if the frequency of the color representation vector corresponding thereto exceeds a predetermined threshold frequency.

19. A method according to claim 11, wherein each color distribution model is represented as a probability distribution of color representation vectors.

20. A method according to claim 19, wherein each of the plurality of pixels is classified as being skin color if the probability of the color representation vector corresponding thereto exceeds a predetermined probability threshold.

21. A method according to claim 11, wherein each color distribution model is represented as a binary map of color representation vectors.

22. A method according to claim 17, 19 or 21, wherein the color representation vectors are derived from perceptual color space values of predetermined skin-color pixels in the previously sampled facial image data.

23. A method according to claim 17, 19 or 21, wherein color representation vectors contain chromatic color values derived from those RGB values of predetermined skin-color pixels in the previously sampled facial image data.

24. A method according to claim 21, wherein the binary map comprises a percentage of the skin color pixels that were identified in the previously sampled facial image data.

25. A method according to claim 24, wherein one of the plurality of pixels is classified as being skin color if the color representation vector corresponding thereto occurs within the binary map.

26. A method according to claim 1, wherein said testing step for determining whether a pixel has predominantly skin color, the threshold selected using the at least one image capture condition.

27. An apparatus for detecting a face in a color digital image formed of a plurality of pixels, said apparatus comprising:
    means for selecting a color distribution model from a plurality of color distribution models, the selection being dependent on at least one image capture condition provided with the color digital image;
    means for testing the color of the plurality of pixels to determine those pixels having predominantly skin color, said testing means utilizing the selected color distribution model; and
    means for executing a facial feature analysis based on the pixels determined as having predominantly skin color by the means for testing.

28. An apparatus according to claim 27, wherein the at least one image capture condition is acquired at a time the color digital image is captured.

29. An apparatus according to claim 28, wherein the color digital image is encoded according to a predetermined format and the at least one image capture condition is represented as meta-data associated with the predetermined format.

30. An apparatus according to claim 27, wherein the at least one image capture condition comprises lighting conditions at a time the color digital image was captured.

31. An apparatus according to claim 27, wherein said means for testing comprises means for dividing the color digital image into a plurality of regions, each region comprising a plurality of pixels,
    wherein said means for testing operates on pixels within each region to determine those ones of the plurality of regions that are predominantly skin color and said means for executing causes the further facial feature analysis to be performed on only those regions determined to be predominantly of skin color.

32. A computer readable medium incorporating a computer program product for detecting a face in a color digital image formed of a plurality of pixels, said computer program product comprising:
    code for selecting a color distribution model from a plurality of color distribution models, the selection being dependent on at least one image capture condition provided with the color digital image;
    code for testing the color of the plurality of pixels to determine those pixels having predominantly skin color, the testing utilizing the selected color distribution model; and
    code for executing facial feature analysis based on the pixels determined as having predominantly skin color by the code for testing.

33. A computer readable medium according to claim 32, wherein the at least one image capture condition is acquired at a time the color digital image is captured.

34. A computer readable medium according to claim 33, wherein the color digital image is encoded according to a predetermined format and the at least one image capture condition is represented as meta-data associated with the predetermined format.

35. A computer readable medium according to claim 32, wherein the at least one image capture condition comprises lighting conditions at a time the color digital image was captured.

36. A computer readable medium according to claim 32, wherein said code for testing comprises code for dividing the color digital image into a plurality of regions, each region comprising a plurality of pixels,
    wherein said code for testing operates on pixels within each region to determine those ones of the plurality of regions that are predominantly skin color, and said code for executing causes the facial feature analysis to be performed on only those regions determined to be predominantly of skin color.

37. A method of detecting a face in a color digital image formed of a plurality of pixels, and method comprising the step of:
    testing the color of the plurality of pixels to determine those pixels having predominantly skin color, the testing utilizing at least one threshold dependent on the least one image capture condition provided with the color digital image, said image capture condition being expressed as metadata and not depending on a brightness of the digital image data; and
    executing a facial feature analysis based on the pixels determined as having predominantly skin color in the testing step.

38. A method of detecting a face in a color digital image formed of a plurality of pixels, said method comprising the step of:
    selecting a threshold from a plurality of thresholds, the selection being dependent on at least one image capture condition provided with the color digital image, said image capture condition being expressed as metadata;
    testing the color of the plurality of pixels to determine those pixels having predominantly skin color, the testing utilizing the selected threshold; and executing a facial feature analysis based on the pixels determined as having predominantly skin color in the testing step.

39. A method according to claim 38, wherein the at least one image capture condition comprises lighting conditions at a time the color digital image was captured.

40. A method according to claim 38, wherein said threshold comprises a color distribution model selected from a plurality of color distribution, models, the selected color distribution model having been generated using previously sampled facial image data.

41. A computer readable medium having a computer program recorded thereon and executable to make a computer detect a face in a color digital image formed of a plurality of pixels, said program comprising:

code for selecting a threshold from a plurality of thresholds, the selection being dependent on at least one image capture condition provided with the color digital image, said image capture condition being expressed as metadata;

code for testing the color of the plurality of pixels to determine those pixels having predominantly skin color, the testing utilizing the selected threshold; and code for executing a fascial feature analysis based on the pixels determined as having predominantly skin color in the testing step.

* * * * *

UNITED STATES PATENT AND TRADEMARK OFFICE
CERTIFICATE OF CORRECTION

PATENT NO. : 7,218,759 B1
APPLICATION NO. : 09/457003
DATED : May 15, 2007
INVENTOR(S) : Ho et al.

It is certified that error appears in the above-identified patent and that said Letters Patent is hereby corrected as shown below:

TITLE SHEET:
Item (30) Foreign Application Priority Data, "PP44009" should read -- PP4009 --;

(56) References Cited, U.S. Patent Documents, Insert:

| | | | |
|---|---|---|---|
| -- 6,774,917 | 08-2004 | Foote et al. | 715/700 |
| 6,816,611 | 11-2004 | Hagiwara et al. | 382/165 |
| 6,853,745 | 02-2005 | Jacobs et al. | 382/154 |
| 6,115,717 | 09-2000 | Mehrotra et al. | 707/102 |
| 6,118,887 | 09-2000 | Cosatto et al. | 382/103 |
| 5,502,775 | 03-1996 | Takeo, Hideya | 382/169 |
| 5,901,245 | 05-1999 | Warnick et al. | 382/190 |
| 5,990,973 | 11-1999 | Sakamoto, Shizuo | 348/576 |
| 6,023,524 | 02-2000 | Yamaguchi, Yoshihiro | 382/162 |
| 6,389,155 | 05-2002 | Funayama et al. | 382/118 |
| 6,389,181 | 05-2002 | Shaffer et al. | 382/305 |
| 6,408,301 | 06-2002 | Patton et al. | 707/102 --; and |

SHEET 4:
Fig. 5, "Smaples" should read -- Samples --.

COLUMN 1:
Line 8, Insert: -- Technical Field of the Invention
    The present invention relates to digital colour images and, in particular, to the detection of faces in colour digital images. --;
Line 13: "En" should read -- In --; and
Line 23, "weaknesses," should read -- weaknesses; --.

COLUMN 5:
Line 10, "T" should read -- T. --;
Line 35, "deter they arm" should read -- determined, they are --;
Line 38, "Mat" should read -- that --; and
Line 47, "flier" should read -- further --.

UNITED STATES PATENT AND TRADEMARK OFFICE
CERTIFICATE OF CORRECTION

PATENT NO. : 7,218,759 B1
APPLICATION NO. : 09/457003
DATED : May 15, 2007
INVENTOR(S) : Ho et al.

It is certified that error appears in the above-identified patent and that said Letters Patent is hereby corrected as shown below:

COLUMN 6:
Line 5, "ie." should read -- size --;
Line 41, "effect" should read -- affect --;
Line 57, "fare" should read -- face --;
Line 63, "wan" should read -- can --; and
Line 67, "th" should read -- that --.

COLUMN 7:
Line 8, "Ritual" should read -- perceptual --.

COLUMN 8:
Line 11, "no$_{13}$flash+outdoors, no$_{13}$flash+" should read
-- no_flash+outdoors, no_flash+ --;
Line 19, "fire" should read -- first --; and
Line 62, "arm" should read -- are --.

COLUMN 9:
Line 51, "defied" should read -- defined --.

COLUMN 10:
Line 23, "analysis" should read -- analysis. --; and
Line 38, "fist" should read -- first --.

COLUMN 11:
Line 8, "rad" should read -- read --;
Line 47, "Hug" should read -- using --; and
Line 65, "change" should read -- changes --.

COLUMN 12:
Line 22, "claim 1" should read -- claim 1, --;
Line 37, "are" should read -- is --;
Line 43, "are" should read -- is --; and
Line 46, "are" should read -- is --.

UNITED STATES PATENT AND TRADEMARK OFFICE
CERTIFICATE OF CORRECTION

PATENT NO. : 7,218,759 B1
APPLICATION NO. : 09/457003
DATED : May 15, 2007
INVENTOR(S) : Ho et al.

It is certified that error appears in the above-identified patent and that said Letters Patent is hereby corrected as shown below:

COLUMN 14:
Line 50, "the" should read -- at --.

COLUMN 15:
Line 9, "distribution," should read -- distribution --.

Signed and Sealed this

Eighth Day of December, 2009

David J. Kappos
*Director of the United States Patent and Trademark Office*